(12) United States Patent
Duran

(10) Patent No.: US 10,510,233 B2
(45) Date of Patent: Dec. 17, 2019

(54) REDUCING AND ELIMINATING THE EFFECTS OF BRIGHT LIGHTS IN A FIELD-OF-VIEW OF A CAMERA

(71) Applicant: JEMEZ TECHNOLOGY LLC, Los Alamos, NM (US)

(72) Inventor: Melvin G. Duran, Los Alamos, NM (US)

(73) Assignee: JEMEZ TECHNOLOGY LLC, Los Alamos, NM (US)

( * ) Notice: Subject to any disclaimer, the term of this patent is extended or adjusted under 35 U.S.C. 154(b) by 26 days.

(21) Appl. No.: 15/990,001

(22) Filed: May 25, 2018

(65) Prior Publication Data

US 2018/0342138 A1  Nov. 29, 2018

Related U.S. Application Data

(60) Provisional application No. 62/511,798, filed on May 26, 2017.

(51) Int. Cl.
| | |
|---|---|
| H04N 5/217 | (2011.01) |
| G08B 13/196 | (2006.01) |
| H04N 7/18 | (2006.01) |
| H04N 5/235 | (2006.01) |
| H04N 5/243 | (2006.01) |

(52) U.S. Cl.
CPC ....... *G08B 13/19604* (2013.01); *H04N 5/217* (2013.01); *H04N 5/2351* (2013.01); *H04N 5/2355* (2013.01); *H04N 5/243* (2013.01); *H04N 7/18* (2013.01); *H04N 7/188* (2013.01)

(58) Field of Classification Search
None
See application file for complete search history.

(56) References Cited

U.S. PATENT DOCUMENTS

| | | | | |
|---|---|---|---|---|
| 7,822,248 B2* | 10/2010 | Ikemoto | ................. | A61B 1/045 |
| | | | | 348/70 |
| 7,929,798 B2* | 4/2011 | Subbotin | ................... | G06T 5/20 |
| | | | | 348/250 |
| 8,218,896 B2* | 7/2012 | Park | ...................... | H04N 9/646 |
| | | | | 382/167 |
| 2004/0032906 A1* | 2/2004 | Lillig | ........................ | G06T 7/12 |
| | | | | 375/240.08 |
| 2011/0069902 A1* | 3/2011 | Yang | ...................... | G06T 5/002 |
| | | | | 382/260 |
| 2015/0348467 A1* | 12/2015 | Gyu | ..................... | G09G 3/3611 |
| | | | | 345/690 |

* cited by examiner

*Primary Examiner* — Christopher G Findley

(57) ABSTRACT

The present disclosure describes how to reduce or eliminate negative effects caused by bright lights in a change detection system. As a result, false alarms caused by lighting changes may be significantly reduced or eliminated.

20 Claims, 5 Drawing Sheets

REDUCING AND ELIMINATING THE EFFECTS OF BRIGHT LIGHTS IN A FIELD-OF-VIEW OF A CAMERA

CROSS-REFERENCE TO RELATED APPLICATION

This application claims priority to U.S. Provisional Application No. 62/511,798, entitled "Reducing and Eliminating the Effects of Bright Lights in a Field-of-View of a Camera", filed on May 26, 2017, the entire disclosure of which is hereby incorporated by reference in its entirety.

BACKGROUND

Closed-circuit television cameras are used throughout the security industry to help security personnel protect people, property and assets. Most, if not all, of these cameras are supported by analytics software that aid security personnel by automatically detecting intrusions and changes in the field-of-view of the camera.

For example, the analytics software may check for differences between a reference image captured from a camera and newer or later images captured from the same camera and of the same scene. Any changes or differences between the pictures are automatically reported to security personnel as an alarm condition or notification of a potential threat. However, current analytics software are not able to discriminate between changes caused by lighting or other environmental conditions. As such, the analytics software can produce false alarms that can quickly become very annoying to operators. As a result, the operators may turn off the cameras or the detection which defeats the purpose of purpose of the security cameras.

It is with respect to these and other general considerations that examples have been described. Also, although relatively specific problems have been discussed, it should be understood that the examples should not be limited to solving the specific problems identified in the background.

SUMMARY

Accordingly described herein is a method for reducing or eliminating the negative effects that lights, and/or other environmental conditions, have on analytics software for camera-based security systems.

For example and as described above, current analytics systems do not and cannot discriminate between changes in lighting and real and/or potential threats. However, changes in lighting are not threats and are thus, when they cause the analytics system to alarm, are considered to be false alarms. Further, image differencing and change detection analytics are not useful at night and/or where there is a high volume of vehicular traffic in a camera's field-of-view simply because the headlights of the vehicles (or other lights in various buildings that go from off to on) would cause too many false alarms.

Accordingly, the system and method described herein accounts for lights (e.g., lights caused by vehicle headlights or other sources of bright lights) in a captured reference image and one or more additional images (e.g., new images) prior to an analytics engine performing an image differencing operation on those images. As a result, false alarms caused by lighting changes may be significantly reduced or eliminated.

BRIEF DESCRIPTION OF THE DRAWINGS

Non-limiting and non-exhaustive examples are described with reference to the following Figures.

DETAILED DESCRIPTION

Figure 1:
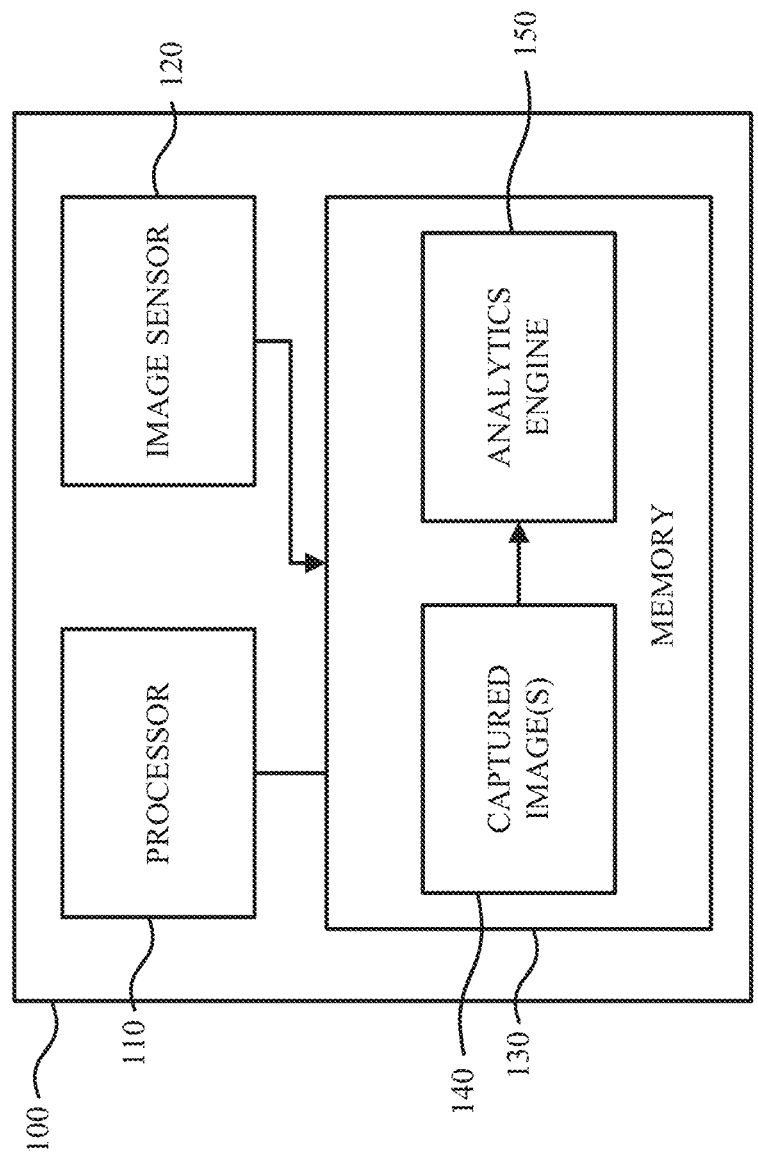
FIG. 1 illustrates an example system for reducing or eliminating the effects of lights within a field-of-view of an image capture device according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of an entirely software implementation, or an implementation combining software and hardware aspects. The following detailed description is therefore not to be taken in a limiting sense, and the scope of the present disclosure is defined by the appended claims and their equivalents.

As described above, current analytics systems cannot discriminate between changes in lighting and real and/or potential threats. However, the changes in lighting are not threats and are thus considered to be false alarms. Further, image differencing and change detection analytics are not useful at night where there is a high volume of vehicular traffic in the camera's field-of-view simply because the false alarm rate would be too high due to vehicle lights. Accordingly, the system and method described herein adjusts both the reference image and any subsequently captured images prior to processing the images to permit determining whether the changes in the images are potential threats. As a result, false alarms caused by bright lights are substantially reduced or even eliminated.

Accordingly, disclosed herein is a system and method that automatically adjusts numerical values of pixels within two or more captured images to account for bright lights within the captured images. For example, in some cases, two-dimensional arrays are formed using two images—one for each image. One image is referred to as a reference image and the other image is referred to herein as a new image. The new image is an image that is captured later in time than the reference image. Capturing and adjusting the arrays may be repeated any number of times (e.g., 3 times) before releasing the images for further processing (e.g., to permit determining if changes between the reference image and the new image are potential threats).

As will be explained in more detail below, each time the process described herein is executed, values are derived by arithmetically measuring specific features of the array using numerical pixel values within each new image array. The measurements include the average value of all pixels within the array and their standard deviation from this average. These values are then used to adjust the pixel values associated only with the lighting changes in the new image array. The reference image is then used to mathematically accumulate a weighted sum of the numerical fractional values of the new image and the current reference image arrays.

Accordingly, this disclosure is directed to a system and method for pre-processing images extracted from a closed circuit television, closed circuit television cameras, pre-recorded video clips, or other such image capture device prior to processing the images for the purpose of detecting changes in the camera's field-of-view. False alarms are a serious problem for closed circuit television camera surveillance applications in the security industry. Alarms from bright lights suddenly appearing or disappearing in the scene of a closed circuit television camera's field-of-view (or in some other image capture device's field-of-view), is one of the most serious problems in security surveillance applications.

Also described is an analytics engine that includes a series of algorithmic procedures and other processes that receives images and measures specific features of the images, adjusts image array pixel values based, at least in part, on feature measurements and outputs a pre-conditioned image array that is ready for further processing such as, for example by an analytics engine.

In some instances, the output includes a two-dimensional image array in which the pixels associated only with arithmetically selected bright lights in the image array have been adjusted. After adjusting the bright light pixels in the image array, the image is released for further processing. As will be explained in more detail below, when an image is captured, pixel values of bright lights within the images are adjusted to effectively blend them with other pixels in the image. In some cases, the pixels of a single image may be adjusted any number of times. That is, the process described herein may be repeated a number of times on a single image.

In some cases, any adjustments to the new image array are saved by accumulating a fractional sum of the new image array in a two-dimensional array referred to herein as the reference image. Reference images are used as the primary image to compare with newly captured images in image differencing analytics.

As explained above and as will be further described in more detail below, when an image is captured, a two-dimensional array of the digitized pixels in each captured image is generated. The arrays are then used to measure the average value (mean) of all array pixels and the standard deviation of all pixel changes within each array. The mean and standard deviation are then used to set all pixel values that are above the sum of the mean and standard deviation to be equal to the sum of the mean and standard deviation.

The final step is to adjust the reference image array of pixels to the sum of weighted values of the current reference and the new image array. This process may be performed any number of times (e.g., 3 times), after which a final reference and new images are released for further processing. Upon release, the reference image has accumulated the pixel changes from the new images which may then be used to compare to the last newly captured images to check for differences between the 2 images.

The method described herein may be implemented by used or otherwise integrated with any camera, image capture device and/or camera-based security system. Examples include the system described in U.S. Pat. No. 9,984,466 entitled "Autonomous Camera-to-Camera Change Detection System" which is hereby incorporated by reference in its entirety.

As used herein the term "analytics engine" refers to any software that is designed to detect changes in a captured image. This includes, but is not limited to motion detection, feature changes, object changes, and the like. The term "reference image" refers to a captured image array that is designated as the first captured image, picture, or image array that is used to accumulate the numerical values of feature changes in other but later in time newly captured images from the same camera and of the same scene. The term "current reference image" refers to the reference image array that has accumulated the numerical values of feature changes from previously processed new images. The term "new image" refers to a captured image array that is designated as the latest image, picture, or image array captured from the same camera and of the same scene to detect differences between this image and a reference image. "Field-of-view" refers to the horizontal and vertical values in degrees of the area visible to a lens that is also visible to an imaging sensor positioned at the focal point of a lens. "Digitize" refers to converting a visual representation of a two-dimensional picture into a two-dimensional array or map of the pixels forming the image. Each pixel in the array or map represents the numerical value of the specific point within the image. The term "mean" refers to the average numerical value of all pixels in the array. "Standard deviation" refers to the average numerical value of all differences between the array pixel values and the average value of all pixels in the array. The term "image" refers to a two-dimensional visual representation or a two-dimensional data array or map of all pixels representing the picture. "Pixel" refers to a unit of area derived by dividing a picture into smaller areas. A pixel may represent the numerical value of a specific point in the picture in the area represented by the pixel before or after adjustment.

FIG. 1 illustrates an example system 100 that may be used to reduce or eliminate false alarms caused by bright lights in images that are captured for various surveillance systems. In some cases, the captured images may be video images. In other instances, the captured images may be still images. In some instances, the system 100 may be associated with a computing device that receives captured images from a remote image capture device. In other examples, the system may include an image capture device or other image sensor. In yet other implementations, the system 100 may be embedded with or otherwise included in an image capture device.

As shown in FIG. 1, the system 100 includes processor 110 and an image sensor 120. The image sensor may be used to capture one or more images including a reference image and any new images. The captured images depict a scene in a field-of-view of the image capture device. Once the images have been captured, the captured images 140 and stored in a memory 130. The analytics engine 150 may then be used to determine whether the captured image includes any bright lights that may potentially cause a false alarm by a threat detection system or other such security system. The analytics engine 150 may also process the captured image to remove the bright light captured in the image using the method described below with respect to FIG. 2.

Figure 2:
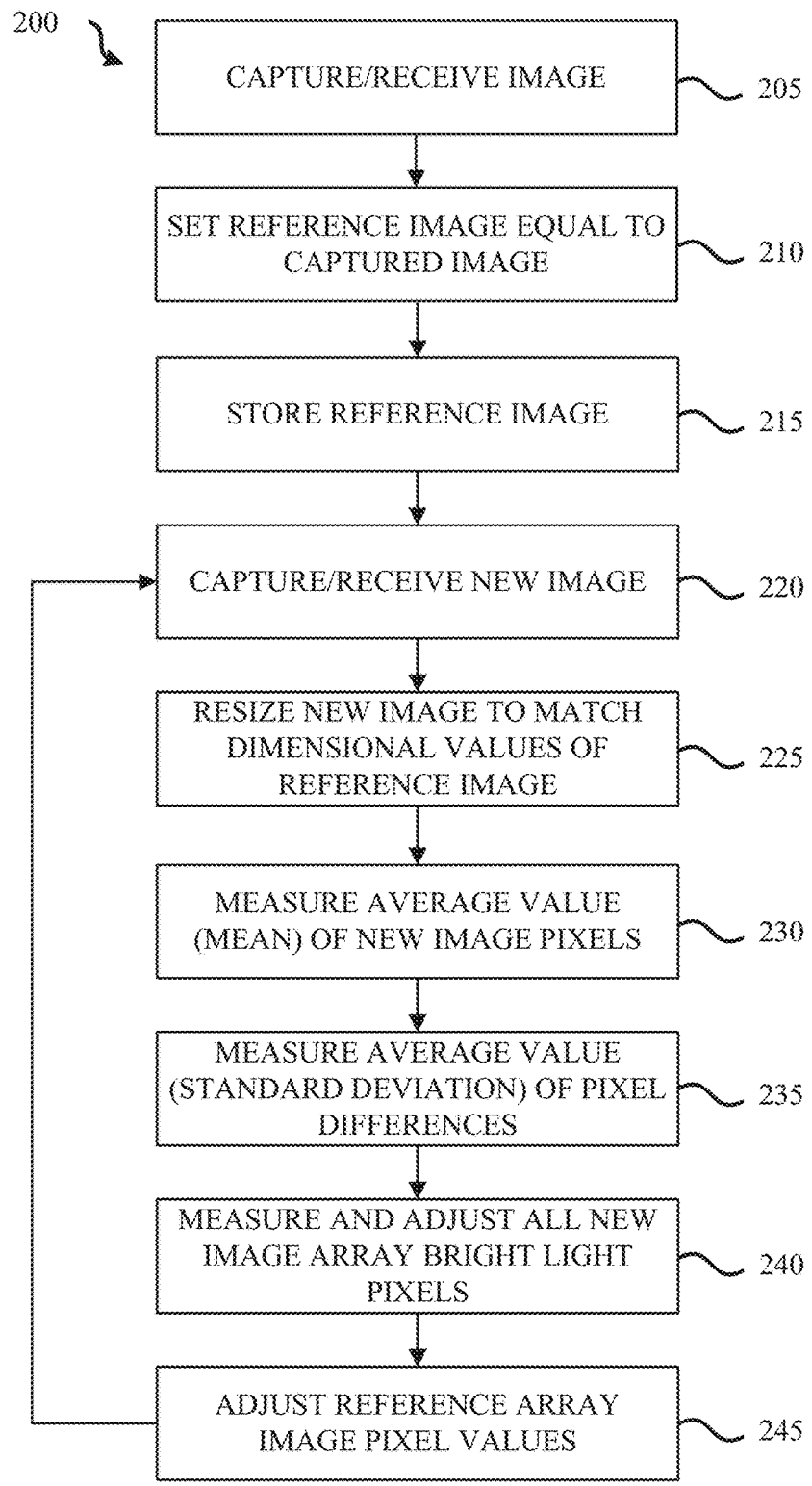
FIG. 2 illustrates a method for reducing and/or eliminating false negatives caused by light within a field-of-view of an image capture device.

FIG. 2 illustrates a method 200 for reducing and/or eliminating false positives caused by light within a field-of-view of an image capture device. The method 200 may be used by the system 100 shown and described above with respect to FIG. 1.

Method 200 begins at operation 205 in which an image is captured and/or received from an image capture device. The image capture device may be a still camera, or a video camera. Once the image has captured or received, flow proceeds to operation 210 and the captured image is set as a reference image. As part of this process, the captured image may be resized and converted into a two-dimensional array. The two-dimensional array of pixels that represents the reference image may then be stored in a memory device or other storage device in operation 215.

Flow then proceeds to operation 220 and a new image is captured or otherwise received. The new image depicts the same scene that was captured in the reference image. In some instances, the new image may be captured or received from the same image capture device that captured the reference image. In other implementations, the new image may be captured or received from the same or different image capture device. Regardless of which image device captured the new image, the new image is captured/received at a later time than the reference image. The new image is also converted to a two-dimensional array of pixels.

Flow may then proceed to (optional) operation 225 in which dimensions of the new image are resized to match the dimensions of the reference image. However, in some cases, default values for the array size of each captured image may be set by a user. In other cases, each image may and/or its associated array may be resized such as described above.

In operation 230, an average numerical value (e.g., the mean) of all pixels in the new image are determined. Flow then proceeds to operation 235 and a numerical value of a standard deviation of pixels relative to the mean for the new image is calculated and saved. In some cases, these operations are performed by an analytics engine such as described herein.

Flow then proceeds to operation 240 in which the numerical value of each pixel in two-dimensional array of the new image is measured. If the numerical value of any pixel in the array is greater than the mathematical sum of the mean value (calculated in operation 230) and standard deviation value (calculated in operation 235), the numerical value of this pixel is set to be equal to the sum. This process may repeat for each pixel in the two-dimensional array that represents the next new image. After checking and adjusting the pixels in the array, the array may be saved as a new image array.

Flow then proceeds to operation 245 and the reference image may then be updated. For example, the pixel locations within the reference image array and the new image array may be exactly relative from one array to another. In this example, the numerical value of pixels in the current reference image array may be automatically adjusted to equivalent pixel locations in the new image array using a weighted mathematical formula. For example, each pixel in the reference image array is set equal to the sum of numerical value equal to ¼ of the current reference pixel and ¾ of the new image pixel at the equivalent location. The process continues until the pixels have been tested, adjusted as required by the check and then saved as the new reference and new images that are subsequently transmitted to a change detection system. Operation 220 to operation 245 may then be repeated any number (e.g., three) times.

Once method 200 is complete, copies of the reference and latest new image may be stored in a memory or other storage device. The images may then be released for further processing by an analytics processor such as described by U.S. Pat. No. 9,984,466 entitled "Autonomous Camera-to-Camera Change Detection System" which has been incorporated by reference in its entirety.

Figure 3:
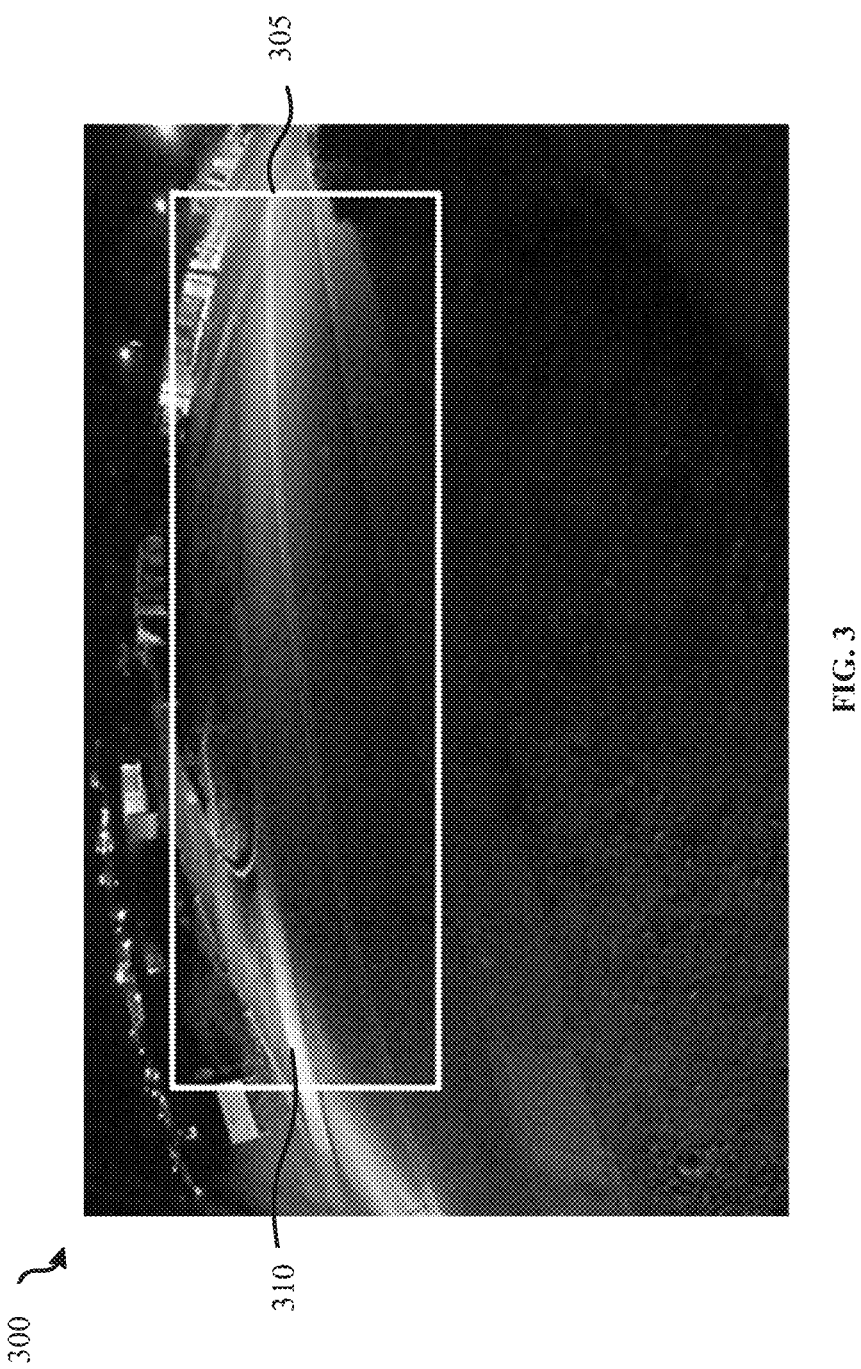
FIG. 3 illustrates an example of car lights spontaneously illuminating an area that is under surveillance by an image capture device according to an example.
Figure 4:
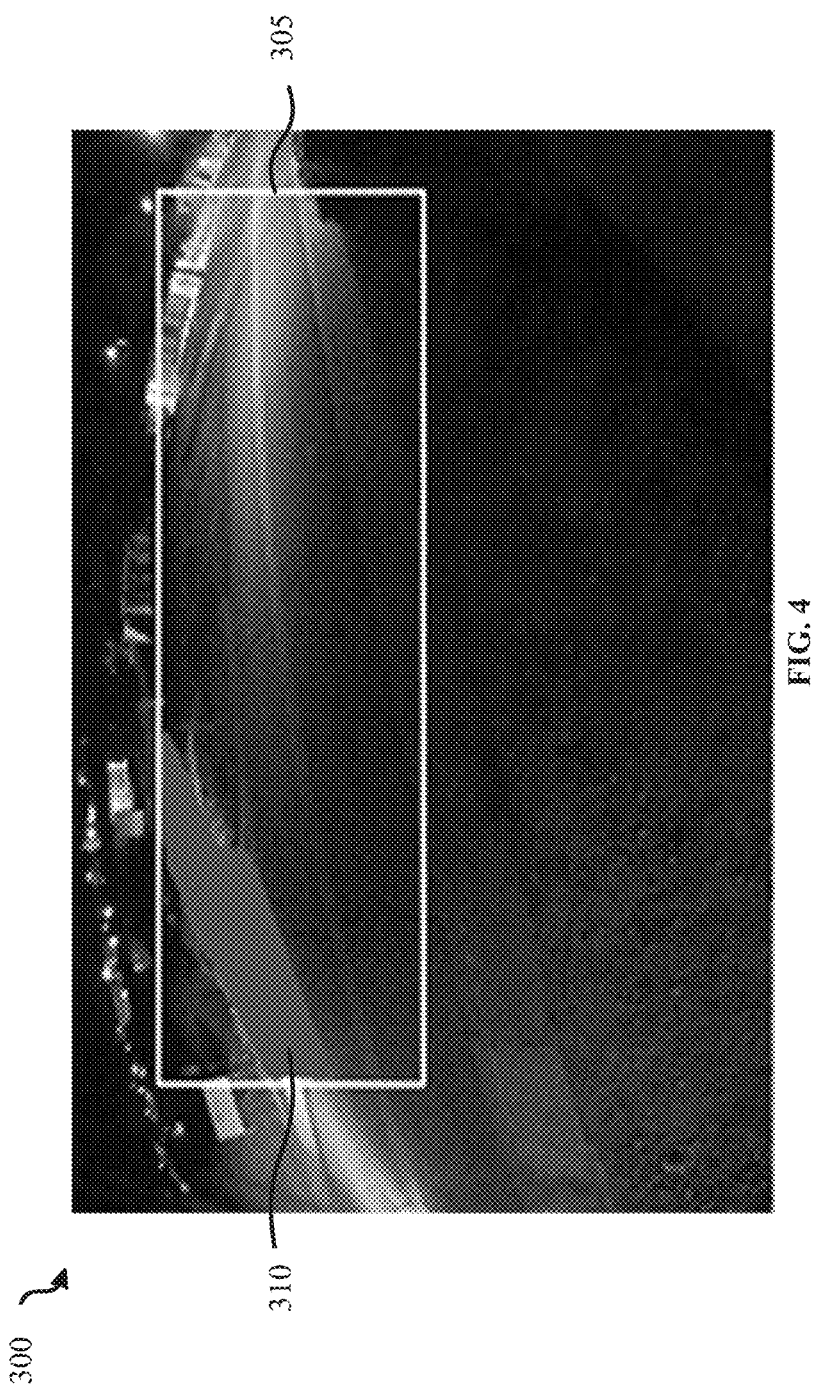
FIG. 4 illustrates how the car lights of FIG. 3 have been adjusted using the examples described here so they do not trigger a false alarm according to an example.
Figure 5:
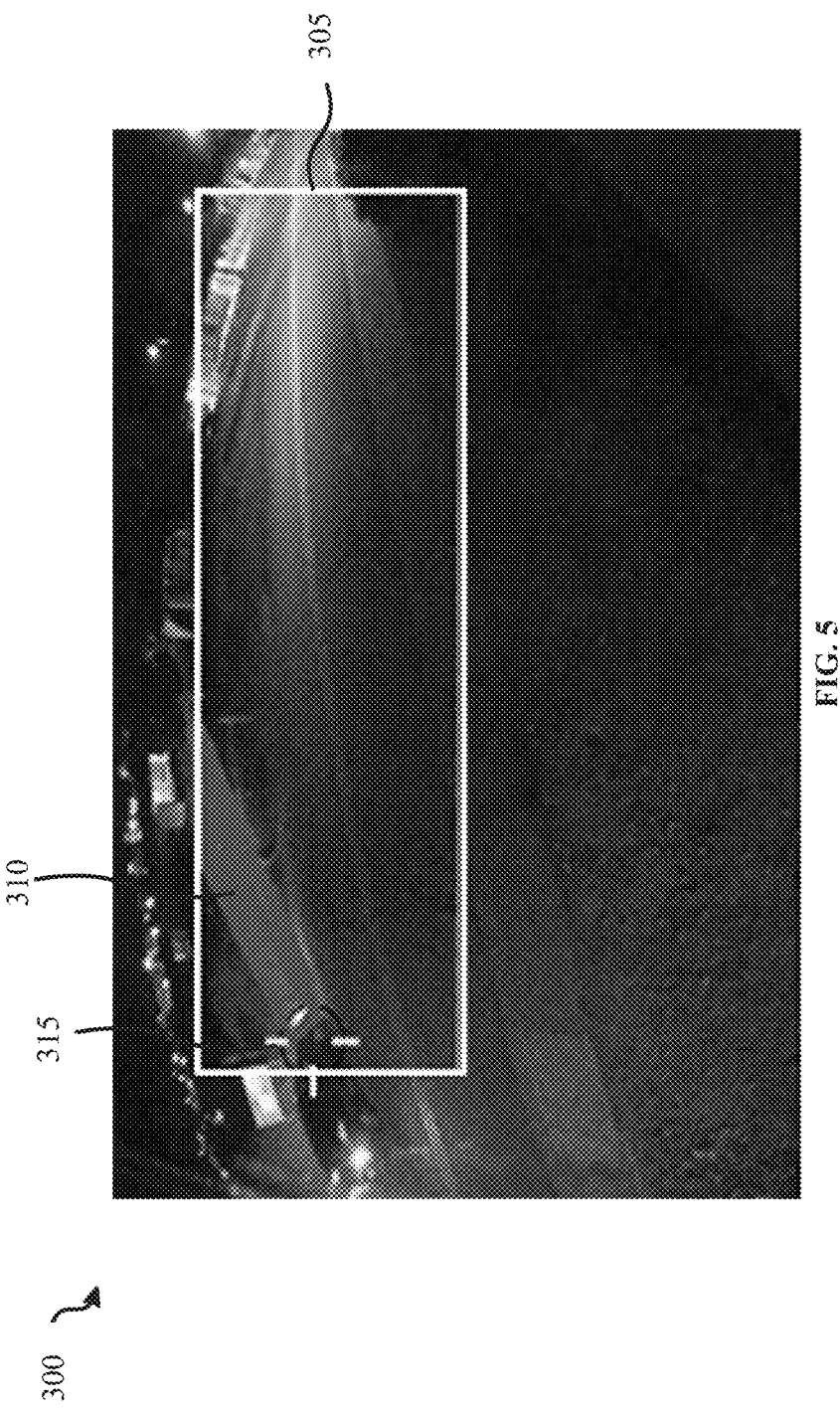
FIG. 5 shows the result of the image processing of FIG. 4 in which the car entered the scene and was detected by change detection analytics while the bright lights in the image were ignored.

FIGS. 3-5 illustrate headlights from a car that illuminate an area within a field-of-view of an image capture device and how the negative effects of these headlights are negated in example images using the system and method described above.

For example and turning to FIG. 3, FIG. 3 shows an example scene 300. An image capture device may have a field-of-view (depicted by the box 305) in the scene. As shown by reference number 310, headlights from an approaching vehicle have entered the field-of-view 305 of the image capture device. In current surveillance systems, the appearance of these headlights would normally cause a false alarm. As such, the system and method described herein may mask the headlights such that the headlights are ignored.

For example and turning to FIG. 4, each pixel in the captured image that is associated with the headlights of the vehicle have been adjusted to be equivalent to the sum of the mean of the pixels in the two-dimensional image array plus the standard deviation of the pixels such as was described above. As such, the pixels that are associated with the headlights are "muted" and as a result, will not trigger a false alarm.

FIG. 5 shows the vehicle entering the field-of-view 305 of the image capture device. As described above, since the system masked the headlights of the vehicle, when the vehicle enters the field-of-view 305 of the image capture device, the vehicle, and not the headlights, will be detected (shown by reference number 315) by a change detection system such as for example the system described in U.S. Pat. No. 9,984,466.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Additionally, each operation in the described methods may be performed in different orders and/or concurrently, simultaneously or substantially simultaneously with other operations.

Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A system, comprising:
   at least one processor; and
   a memory storing instructions that, when executed by the at least one processor, perform a method, comprising:
   receiving a reference image;
   receiving a new image;
   determining an average value of pixels in the new image;
   determining an average value of differences of the pixels in the new image;
   determining whether a value of a pixel of the new image is greater than a sum of the average value of the pixels in the new image and the average value of the difference of the pixels in the new image; and
   when it is determined that the value of the pixel of the new is greater than the sum, changing the value of the pixel to the sum of the average value of the pixels in the new image and the average value of the difference of the pixels in the new image.

2. The system of claim 1, further comprising instructions for representing the reference image as a two-dimensional array of pixels.

3. The system of claim 1, further comprising instructions for representing the new image as a two-dimensional array of pixels.

4. The system of claim 1, wherein the reference image is a still image.

5. The system of claim 1, further comprising instructions for updating the reference image using the changed value of the pixel.

6. The system of claim 5, further comprising instructions for sending the updated reference image and the new image to a change detection system.

7. The system of claim 1, wherein the reference image is captured by a closed-circuit television camera.

8. A method, comprising:
receiving a reference image;
receiving a new image;
determining an average value of pixels in the new image;
determining an average value of differences of the pixels in the new image;
determining whether a value of a pixel of the new image is greater than a sum of the average value of the pixels in the new image and the average value of the difference of the pixels in the new image; and
when it is determined that the value of the pixel of the new is greater than the sum, changing the value of the pixel to the sum of the average value of the pixels in the new image and the average value of the difference of the pixels in the new image.

9. The method of claim 8, further comprising representing the reference image as a two-dimensional array of pixels.

10. The method of claim 8, further comprising representing the new image as a two-dimensional array of pixels.

11. The method of claim 8, wherein the reference image is a still image.

12. The method of claim 8, further comprising updating the reference image using the changed value of the pixel.

13. The method of claim 12, further comprising sending the updated reference image to a change detection system.

14. The method of claim 8, wherein the reference image is captured by a closed-circuit television camera.

15. A system, comprising:
at least one processor; and
a memory storing instructions that, when executed by the at least one processor, perform a method, comprising:
receiving a reference image;
receiving a new image;
determining an average value of pixels in the new image;
determining an average value of differences of the pixels in the new image;
determining whether a value of a pixel of the new image is greater than a sum of the average value of the pixels in the new image and the average value of the difference of the pixels in the new image;
when it is determined that the value of the pixel of the new is greater than the sum, changing the value of the pixel to the sum of the average value of the pixels in the new image and the average value of the difference of the pixels in the new image; and
updating the reference image using in which each pixel in a reference image pixel array is set equal to the sum of one-fourth of a numerical value of a specific point in a reference image array plus three-fourths of a numerical value of a specific point in a new image array for all pixels in the reference image pixel array.

16. The system of claim 15, further comprising instructions for representing the reference image as a two-dimensional array of pixels.

17. The system of claim 15, further comprising instructions for representing the new image as a two-dimensional array of pixels.

18. The system of claim 15, wherein the reference image is a still image.

19. The system of claim 15, further comprising instructions for sending the updated reference image to a change detection system.

20. The system of claim 15, wherein the reference image is captured by a closed-circuit television camera.

* * * * *